(12) United States Patent
Kanakis

(10) Patent No.: US 11,050,277 B2
(45) Date of Patent: Jun. 29, 2021

(54) WIRELESS POWER BANK WITH ADHESIVE PAD

(71) Applicant: MIWORLD ACCESSORIES LLC, New York, NY (US)

(72) Inventor: Andrew Kanakis, New York, NY (US)

(73) Assignee: MIWORLD ACCESSORIES LLC, New York, NY (US)

( * ) Notice: Subject to any disclaimer, the term of this patent is extended or adjusted under 35 U.S.C. 154(b) by 167 days.

(21) Appl. No.: 16/272,301

(22) Filed: Feb. 11, 2019

(65) Prior Publication Data

US 2020/0259345 A1     Aug. 13, 2020

(51) Int. Cl.
   *H02J 7/00*     (2006.01)
   *H02J 7/02*     (2016.01)
   *H02J 50/10*    (2016.01)

(52) U.S. Cl.
   CPC ............ *H02J 7/0045* (2013.01); *H02J 7/025* (2013.01); *H02J 50/10* (2016.02)

(58) Field of Classification Search
   CPC .......... H02J 7/0045; H02J 7/025; H02J 50/10; H02J 50/001; H02J 50/005; H02J 50/05; H02J 50/12; H02J 50/15; H02J 50/20; H02J 50/23; H02J 50/27; H02J 50/30; H02J 50/40; H02J 50/402; H02J 50/50; H02J 50/502; H02J 50/60; H02J 50/70; H02J 50/80
   USPC ....................................................... 320/108
   See application file for complete search history.

(56) References Cited

U.S. PATENT DOCUMENTS

| | | | | |
|---|---|---|---|---|
| 4,851,695 A * | 7/1989 | Stein | ..................... | H01L 31/167 250/551 |
| 9,728,989 B2 * | 8/2017 | Kim | ........................ | H02J 7/025 |
| 10,135,304 B2 * | 11/2018 | Jung | ........................ | H02J 50/12 |
| 10,206,474 B2 * | 2/2019 | Brzezinski | ............ | H02J 7/0044 |
| 10,390,594 B2 * | 8/2019 | Brzezinski | ............. | A45C 13/02 |
| 10,502,351 B2 * | 12/2019 | Jaeger | ..................... | F04B 17/06 |

(Continued)

FOREIGN PATENT DOCUMENTS

| | | | | | |
|---|---|---|---|---|---|
| GB | 2518201 A | * | 3/2015 | ............. | F16M 11/16 |
| KR | 20160054944 A | * | 5/2016 | | |
| WO | WO-2017162897 A1 | * | 9/2017 | ............. | A47G 29/00 |

OTHER PUBLICATIONS

Libtech, "BricksPower, first-ever true wireless charger on the go", https://www.kickstarter.com/projects/349007245/brickspower-first-ever-true-wireless-charger-on-th; Kickstarter, PBC, 2019.

*Primary Examiner* — M Baye Diao
(74) *Attorney, Agent, or Firm* — Notaro, Michalos & Zaccaria P.C.

(57) ABSTRACT

A power bank containing a rechargeable battery for wirelessly charging a portable device by induction power transmission, the power bank having a housing having a power transmission surface for placement adjacent a power receiving surface of a chargeable portable device and a reusable adhesive pad over at least part of the power transmission surface, made of an adhesive that is capable of removably sticking to the power receiving surface of a portable device for temporarily holding the surfaces adjacent each other with a protective cover for covering the adhesive pad when not in use and a recess in the housing opposite the power transmission surface for temporarily holding the cover.

15 Claims, 5 Drawing Sheets

(56) References Cited

U.S. PATENT DOCUMENTS

| | | | |
|---|---|---|---|
| 2011/0050382 A1* | 3/2011 | Baarman | H01F 27/255 336/221 |
| 2012/0274148 A1* | 11/2012 | Sung | H02J 7/025 307/104 |
| 2014/0368163 A1* | 12/2014 | Ho | H02J 50/40 320/108 |
| 2015/0050881 A1* | 2/2015 | Chen | H04B 5/0037 455/41.1 |
| 2017/0063170 A1* | 3/2017 | Harper | H02J 7/025 |

* cited by examiner

WIRELESS POWER BANK WITH ADHESIVE PAD

FIELD AND BACKGROUND OF THE INVENTION

The present invention relates generally to the field of power banks for charging smart phones and other portable wireless devices, and in particular to a new and useful wireless, i.e. inductive, power bank with a reusable sticky surface for removably holding a smart phone to a power transfer area of the power bank for recharging the portable device battery.

Inductive power transmission charging pads are known, for example from U.S. Pat. No. 9,601,933 to Graham, that can recharge the battery of certain smart phones that include internal power coils that electrically couple to the coils of the charging pad. Such charging pads commonly receive power from a cord that is plugged into a wall socket.

Wireless charging pads are also known that include their own internal battery so as not to need a cord and wall socket. Such devices are known as power banks and an example can be found in Published Patent Application US 2015/0050881 to Chen. Chen teaches a mechanical structure for property orienting the smart phone on his charging surface, namely a cradle for engaging and centering the smart phone over the induction coil of this power bank.

While wireless charging power banks currently exist, they have to be kept on a flat surface where a smart phone, mobile or other wireless device can rest on top while charging takes place. It is difficult to hold both a wireless device and power bank in addition to being able to use device while it is charging.

A need remains for a wireless power bank that better facilitates the proper mating of a smart phone or other wireless device to the charging surface of the bank and, at the same time, allows the device with mated power bank to be used.

SUMMARY OF THE INVENTION

It is an object of the present invention to provide a power bank for wirelessly charging a portable device by induction power transmission, the power bank comprising: a housing having a power transmission surface for placement adjacent a power receiving surface of a chargeable portable device; a reusable adhesive pad over at least part of the power transmission surface, made of an adhesive that is capable of removably sticking to the power receiving surface of a portable device for temporarily holding the surfaces adjacent each other; and a protective cover for covering the adhesive pad when not in use; the housing including a recess on a side opposite from the power transmission surface of a size and shape for temporarily receiving and retaining the cover when the cover is removed from the adhesive pad.

Accordingly, a further object of the invention is to provide a wireless power bank that allows one to charge their smart phone on the go, while using it without having to position it on a flat surface for the duration of the charge. The reusable adhesive adheres this slim power bank to the back of one's smart phone or other wireless device for the duration of the charge.

A still further object of the invention is to provide a removable and reusable wireless charging power bank that adheres to a mobile or wireless devices while charging. A reusable adhesive connects the power bank to the device and can be removed and reused over again. A small cover for the adhesive is applied and removed when not in use and stored in a cavity on the reverse side of the device when the power bank is in use.

A further object of the invention is to provide a power bank containing a rechargeable battery for wirelessly charging a portable device by induction power transmission, the power bank having a housing having a power transmission surface for placement adjacent a power receiving surface of a chargeable portable device and a reusable adhesive pad over at least part of the power transmission surface, made of an adhesive that is capable of removably sticking to the power receiving surface of a portable device for temporarily holding the surfaces together and adjacent each other for induction charging.

The power bank is also ergonomically designed to easily grip and release once finished. The adhesive is covered when not in use so the power bank can be stored or used the traditional way by placing it on a table or ledge with one's wireless device on top.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
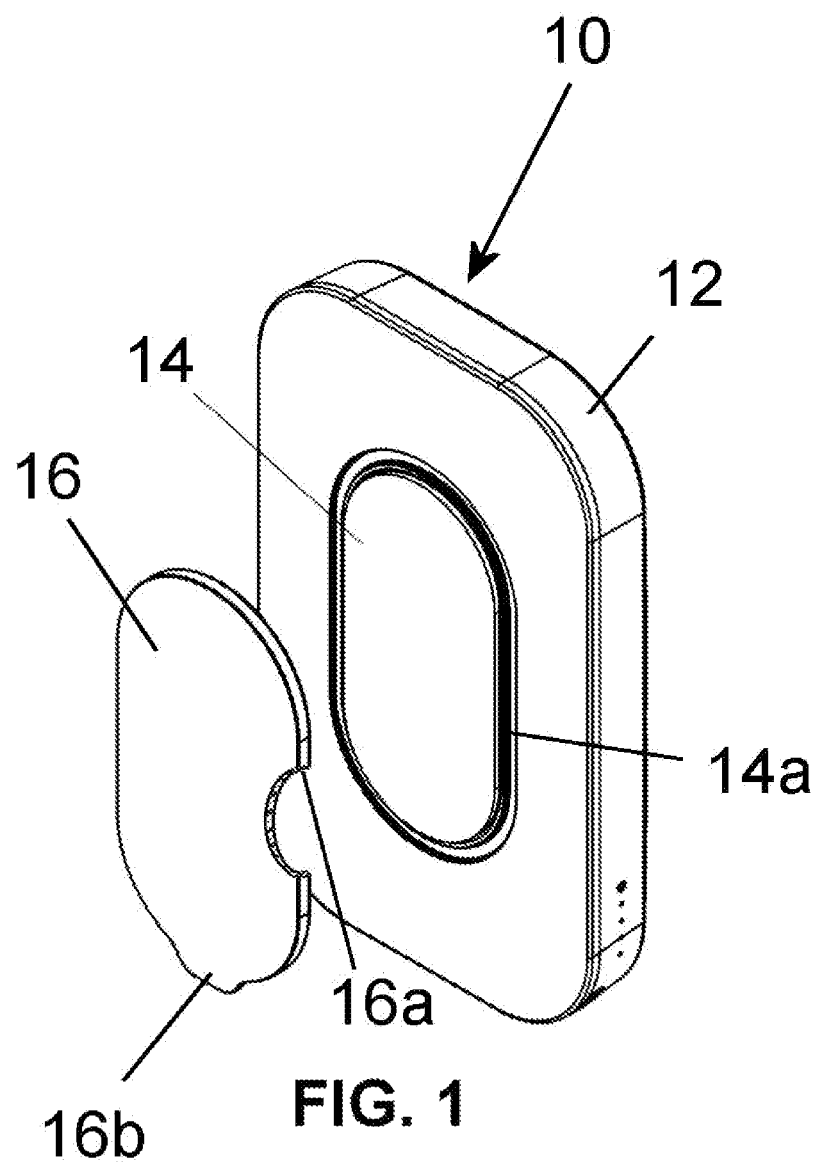
FIG. 1 is a perspective view of a rear side of a power bank containing a rechargeable battery for wirelessly charging a portable device such as but not limited to a smart phone, a tablet, a GPS device, or other portable device containing a rechargeable battery or other charge carrying medium, by induction power transmission, FIG. 1 including a cover that has been separated from a reusable adhesive pad, with a part of the cover near its perimeter cut way to reveal a lip around the cover perimeter.
Figure 2:
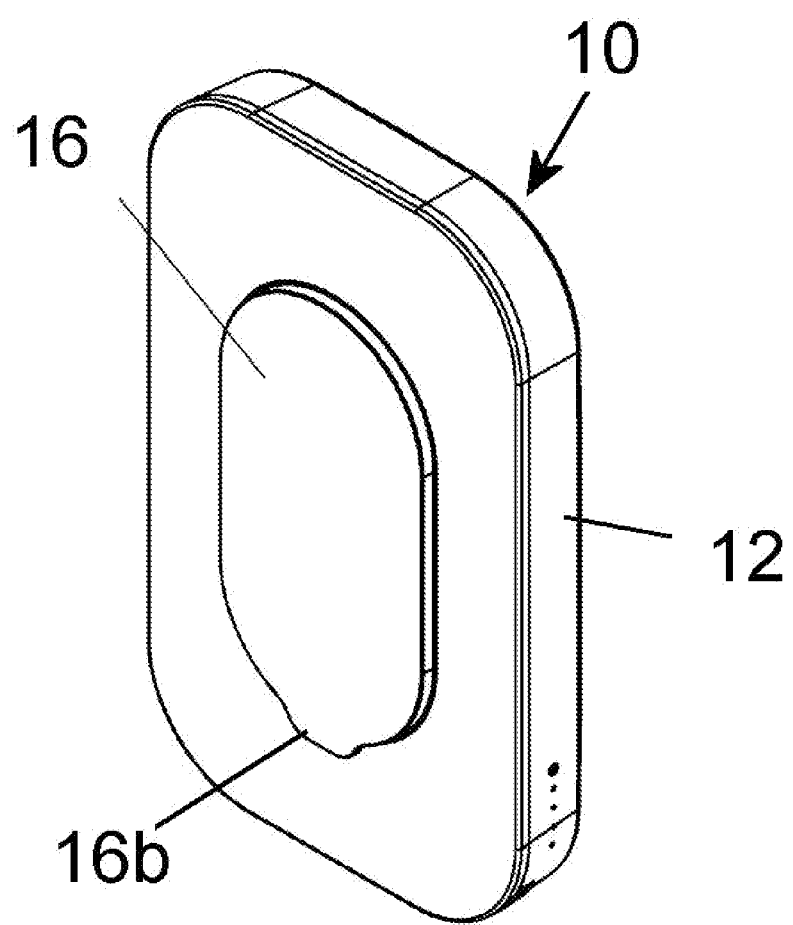
FIG. 2 is a view similar to FIG. 1 but with the cover covering the adhesive pad for storage of the power bank between uses.
Figure 4:
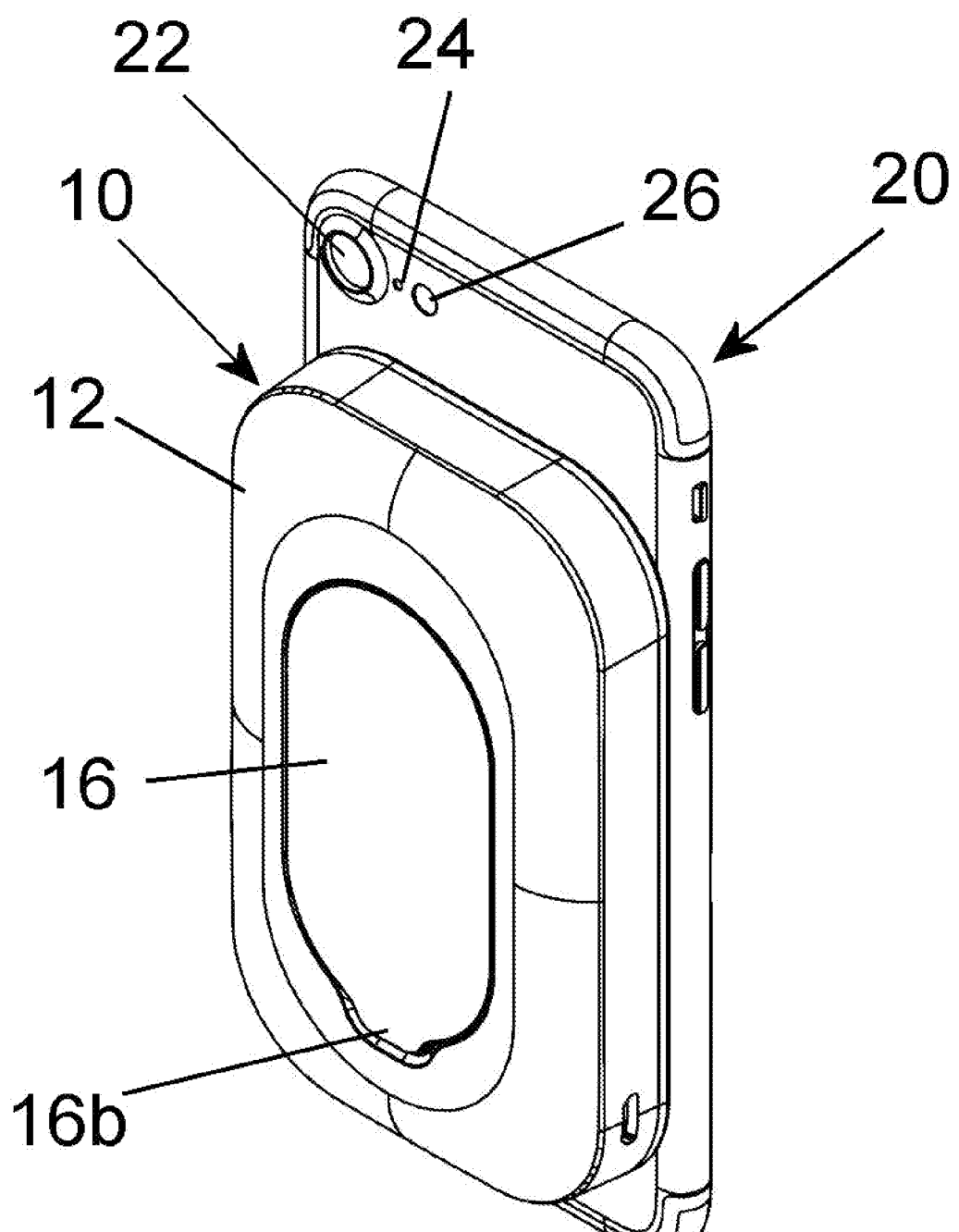
FIG. 4 is a perspective view of a front side of the power bank with its power transmission surface placed adjacent and adhered to a power receiving surface of a portable device such as an iPhone brand smart phone, for temporarily holding the surfaces adjacent each other for charging the iPhone smart phone.

Referring now to the drawings, in which like reference numerals are used to refer to the same or similar elements, FIG. 1 shows a power bank 10 containing a rechargeable battery for wirelessly charging a portable device such as but not limited to a smart phone 20 shown in FIG. 4, by induction power transmission.

The power bank 10 comprises a housing 12, made of plastic or metal, and having a rear power transmission surface for placement adjacent a power receiving surface of the chargeable portable device. Generally centered in this rear surface of the housing is a reusable adhesive pad 14 that extended over at least part of the power transmission surface. Adhesive pad 14 is made of a sticky, non-curing polymer that is capable of removably sticking to the power receiving surface of a portable device for temporarily holding the surfaces together and adjacent each other as shown in FIG. 4.

Figure 3:
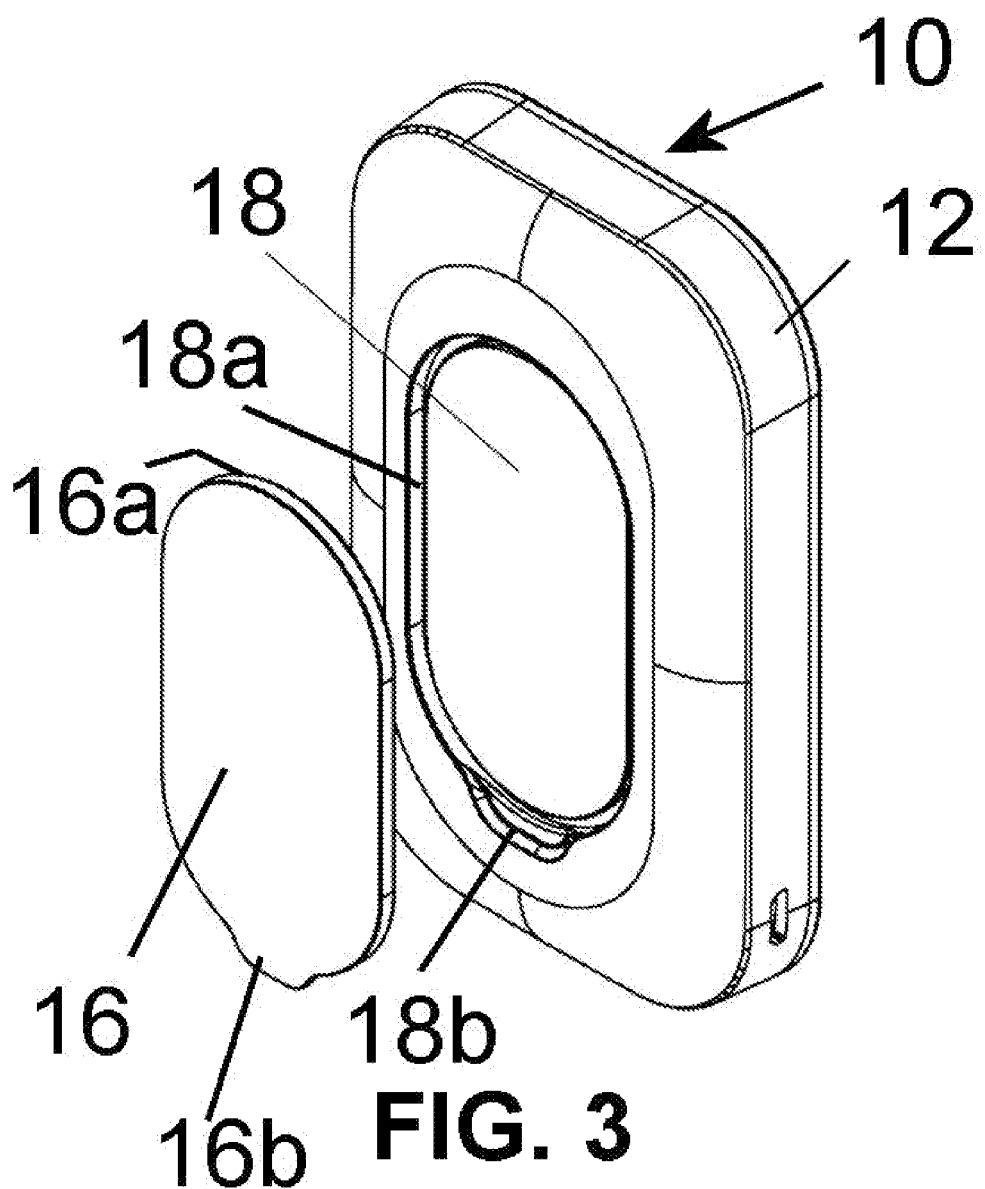
FIG. 3 is a perspective view of a front side of the power bank of FIG. 1 with the cover after it has been removed from the adhesive pad and just before it is engaged in a recess in the housing of the power bank in preparation for use of the power bank to recharge a portable device.

A protective cover 16 for covering the adhesive pad 14 when not in use is preferably made of flexible elastomer and can be used to cover and protect the adhesive pad from dirt and damage when the power bank is not in use, and for being removed from the pad to expose the pad for use. As shown in FIG. 3, the housing 12 includes a recess 18 on a front side of the housing, opposite from the power transmission surface. This recess 18 is of a size and shape for temporarily receiving and retaining the cover 16 when the cover is removed from the adhesive pad and the power bank is engaged with the portable device for charging.

As shown in FIG. 4, the power transmission surface and the rear surface of the housing 12 are smaller, i.e., shorter than the power receiving surface of the chargeable portable device 20 so as not to cover photographic features of the portable device such as a lens 22, a microphone opening 24 and a light source or flash 26. The widths of the power bank 10 and portable device 20 can be roughly the same to facilitate centering of the power bank on the portable device without the need for any mechanical structures to align the power transmitting and power receiving surfaces.

The housing has at least two, but preferably four rounded corners on its front side opposite from the power transmission surface to facilitate an ergonomic holding of the temporarily combined power bank and portable device by a user, when the power bank and device surfaces are adhered to and adjacent each other. This allows the user to comfortably hold and use the device even while the device is being charged.

Figure 5:
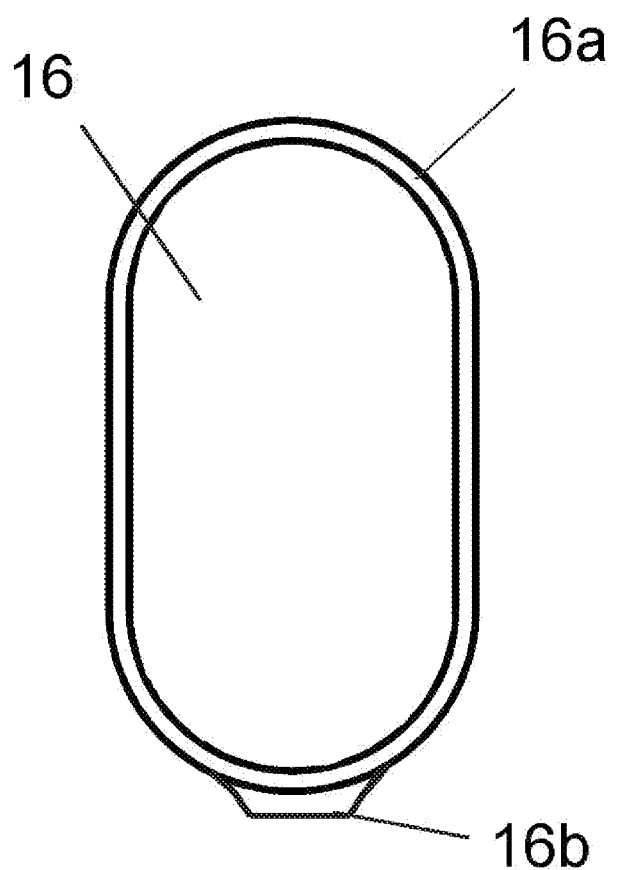
FIG. 5 is a rear side elevational view of the cover showing its lip for helping to retain the cover in the housing recess.

To help secure the cover 16 on place in the recess 18, the recess includes a first channel 18a around its perimeter. As shown in FIGS. 1 and 5, the cover 16 includes a raised lip 16a around its perimeter for engaging into the first channel 18a when the cover is in the recess 18. The housing also includes a second channel 14a around the adhesive pad 14, the raised lip 16a also engaging into this second channel when the cover is covering the adhesive pad to keep the cover in place.

To help the user manipulate the cover, e.g. to remove it from the adhesive pad 14 and from the recess 18, the cover includes a tab 16b extending from its perimeter at its bottom or top side. To help better accommodate the cover 16 in the recess 18 during use of the power bank, the recess 18 also includes a notch 18b for receiving the tab 16b. This allows the outer surface of the cover 16 to be flush with the front surface of the housing 12 around the recess to even better ergonomically fit the user's hand while using the power bank plus adhered portable device combination.

Cover 16 and the surface of housing 12 are advantageously made of silicone for softness and comfort although any suitable material may be used. The adhesive pad 18 is advantageously made of washable sticky gel for durability and reusability although any suitable material may be used.

While a specific embodiment of the invention has been shown and described in detail to illustrate the application of the principles of the invention, it will be understood that the invention may be embodied otherwise without departing from such principles.

What is claimed is:

1. A power bank containing a rechargeable battery for wirelessly charging a portable device by induction power transmission, the power bank comprising:
   a housing having a power transmission surface for placement adjacent a power receiving surface of a chargeable portable device;
   a reusable adhesive pad over at least part of the power transmission surface, made of an adhesive that is capable of removably sticking to the power receiving surface of a portable device for temporarily holding the surfaces adjacent each other; and
   a protective cover for covering the adhesive pad when not in use;
   the housing including a recess on a side opposite from the power transmission surface of a size and shape for temporarily receiving and retaining the cover when the cover is removed from the adhesive pad.

2. The power bank of claim 1, wherein the power transmission surface is smaller than the power receiving surface of the chargeable portable device so as not to cover photographic features of the portable device.

3. The power bank of claim 1, wherein the housing has at least two rounded corners on its side opposite from the power transmission surface for being ergonomically held by a user when the surfaces are adjacent each other.

4. The power bank of claim 1, wherein the recess includes a channel around its perimeter, the cover including a raised lip around its perimeter for engaging in the channel.

5. The power bank of claim 1, wherein housing has a channel around the adhesive pad, the cover including a raised lip around its perimeter for engaging in the channel.

6. The power bank of claim 1, wherein the recess includes a first channel around its perimeter, the cover including a raised lip around its perimeter for engaging in the first channel when the cover is in the recess, the housing including a second channel around the adhesive pad, the raised lip engaging in the second channel when the cover is covering the adhesive pad.

7. The power bank of claim 1, wherein the housing has at least two rounded corners on its side opposite from the power transmission surface for being ergonomically held by a used when the surfaces are adjacent each other, the recess including a channel around its perimeter, the cover including a raised lip around its perimeter for engaging in the channel.

8. The power bank of claim 1, wherein the housing has at least two rounded corners on its side opposite from the power transmission surface for being ergonomically held by a user when the surfaces are adjacent each other, the housing having a channel around the adhesive pad, the cover including a raised lip around its perimeter for engaging in the channel.

9. The power bank of claim 1, wherein the housing has at least two rounded corners on its side opposite from the power transmission surface for being ergonomically held by a user when the surfaces are adjacent each other, the recess including a first channel around its perimeter, the cover including a raised lip around its perimeter for engaging in the first channel when the cover is in the recess, the housing including a second channel around the adhesive pad, the raised lip engaging in the second channel when the cover is covering the adhesive pad.

10. A power bank containing a rechargeable battery for wirelessly charging a portable device by induction power transmission, the power bank comprising: a housing having a power transmission surface for placement adjacent a power receiving surface of a chargeable portable device; and a reusable adhesive pad over part of the power transmission surface and entirely surrounded by a portion of the power transmission surface, made of an adhesive that is capable of removably sticking to the power receiving surface of a portable device for temporarily holding the surfaces adjacent each other; the power bank including a protective cover for covering the adhesive pad when not in use, the housing including a recess on a side opposite from the power transmission surface of a size and shape for temporarily receiving and retaining the cover when the cover is removed from the adhesive pad, wherein the recess includes a channel around its perimeter, the cover including a raised lip around its perimeter for engaging in the channel.

11. The power bank of claim 10, the housing having a channel around the adhesive pad, the cover including a raised lip around its perimeter for engaging in the channel.

12. The power bank of claim 10, wherein the recess includes a first channel around its perimeter, the cover including a raised lip around its perimeter for engaging in the first channel when the cover is in the recess, the housing including a second channel around the adhesive pad, the raised lip engaging in the second channel when the cover is covering the adhesive pad.

13. The power bank of claim 10, wherein the housing has at least two rounded corners on its side opposite from the power transmission surface for being ergonomically held by a user when the surfaces are adjacent each other, the recess including a channel around its perimeter, the cover including a raised lip around its perimeter for engaging in the channel.

14. The power bank of claim 10, wherein the housing has at least two rounded corners on its side opposite from the power transmission surface for being ergonomically held by a user when the surfaces are adjacent each other, the housing having a channel around the adhesive pad, the cover including a raised lip around its perimeter for engaging in the channel.

15. The power bank of claim 10, wherein the housing has at least two rounded corners on its side opposite from the power transmission surface for being ergonomically held by a user when the surfaces are adjacent each other, the recess including a first channel around its perimeter, the cover including a raised lip around its perimeter for engaging in the first channel when the cover is in the recess, the housing including a second channel around the adhesive pad, the raised lip engaging in the second channel when the cover is covering the adhesive pad.

\* \* \* \* \*